Feb. 7, 1939.  D. H. TINSLEY  2,145,903
WEIGHING DEVICE
Filed July 13, 1937  2 Sheets-Sheet 1
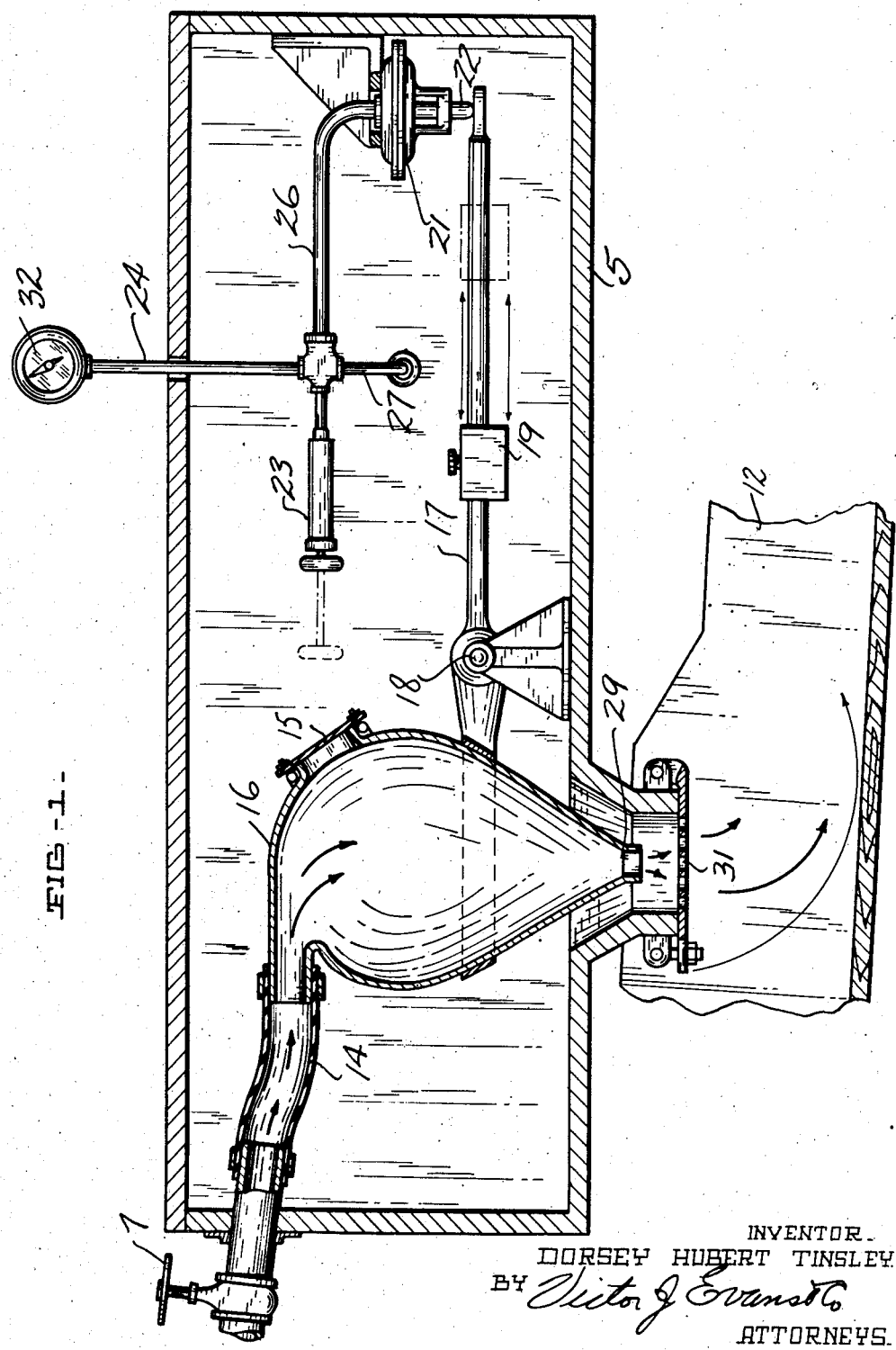
FIG-1-
INVENTOR.
DORSEY HUBERT TINSLEY
BY Victor J. Evans & Co.
ATTORNEYS.

Feb. 7, 1939.　　　D. H. TINSLEY　　　2,145,903
WEIGHING DEVICE
Filed July 13, 1937　　2 Sheets-Sheet 2
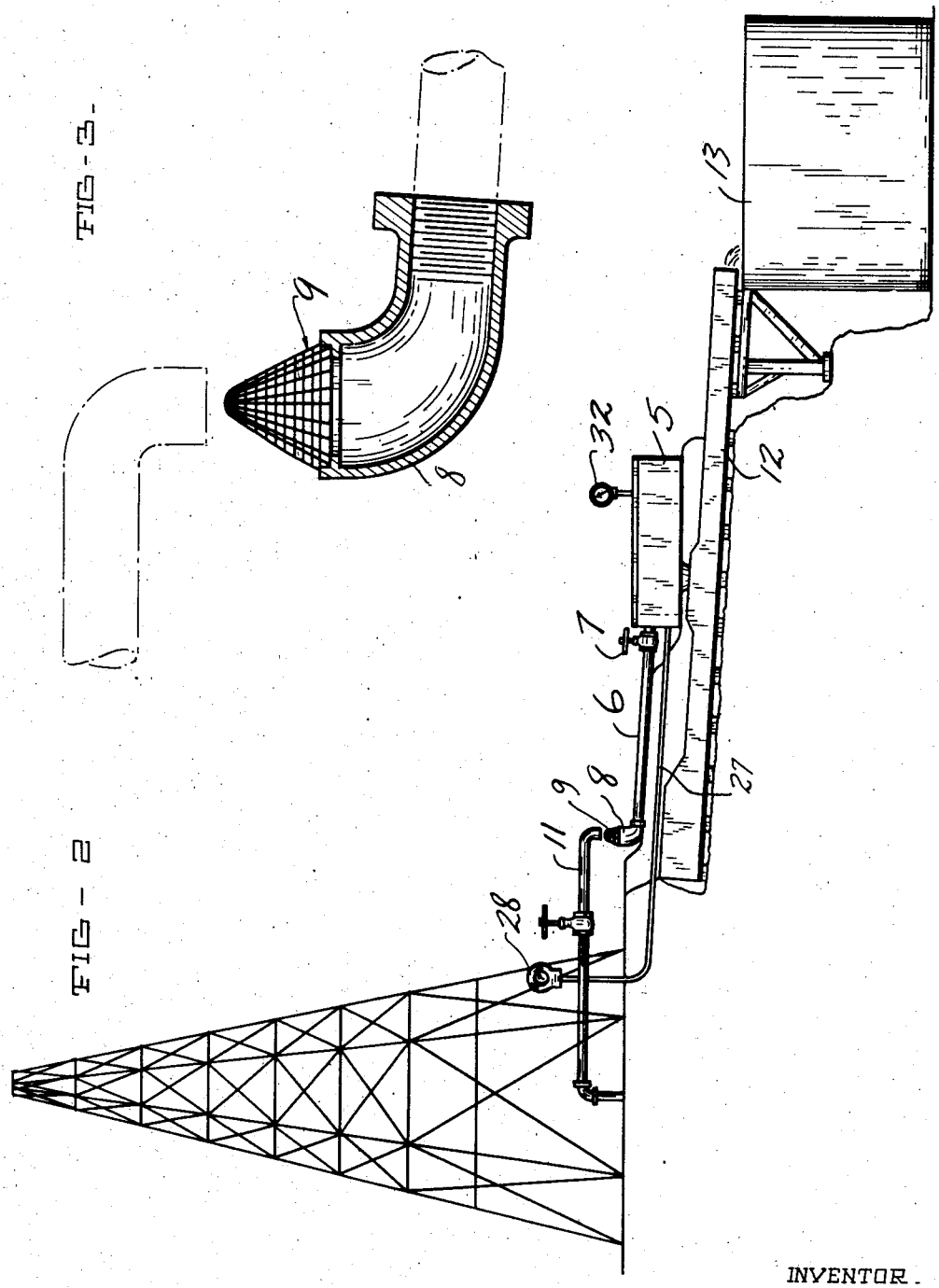
INVENTOR.
DORSEY HUBERT TINSLEY
BY
ATTORNEYS.

Patented Feb. 7, 1939

2,145,903

UNITED STATES PATENT OFFICE 2,145,903

WEIGHING DEVICE

Dorsey Hubert Tinsley, Avenal, Calif.

Application July 13, 1937, Serial No. 153,387

2 Claims. (Cl. 265—44)

This invention relates to improvements in weighing devices and has particular reference to a device for weighing the mud which is pumped from deep wells, such as oil wells and the like.

The principal object of this invention is to determine the percentage of mud in the flow from the well, as this percentage of mud has a very definite relation to the conditions existing in the well and its depth.

Other objects and advantages will be apparent during the course of the following description.

In the accompanying drawings forming a part of this specification and in which like numerals are employed to designate like parts throughout the same, Fig. 1 is a side elevation of my weighing apparatus, the same being shown partly in cross section;

Fig. 2 is a side elevation of the arrangement of my device in connection with a well structure; and Fig. 3 is an enlarged detailed view of the receiving end of my apparatus.

In well drilling it is customary to employ drilling fluid in the form of mud which is pumped into the well to facilitate the drilling; and as the drilling progresses, this mud in its circulation down through the drill pipe and up through the casing carries with it certain information which is valuable in that the percentage of mud introduced into the line and later recovered determines to a very definite degree what is happening below ground.

Applicant has, therefore, devised a means for continuously weighing this mud, thereby securing a definite record of the drilling operation.

In the accompanying drawings wherein for the purpose of illustration is shown a preferred embodiment of my invention, the numeral 5 designates a box located adjacent the well, into which housing in the form of a box a pipe 6 extends, which pipe has a control valve 7, the purpose of which is obvious. On the receiving end of the pipe 6 is a fitting 8 on which is mounted a strainer 9. Over this fitting is the outlet end of a conduit or pipe 11 leading from the well being drilled. Beneath the box 5 is a sluice box 12 which receives the discharge from the device and empties the same into a settling tank 13. The pipe 6 enters the box 5, as before mentioned, and has a flexible connection 14 to a receiver 16. This receiver in the form of a container is mounted on one end of a beam or arm 17, pivoted as at 18. A sliding weight 19, movable on one end of the beam, serves as a counter-balance for the weight of the receiver 16. At 21 I have shown a diaphragm arrangement, which has an end 22 which contacts the end of the beam 17, upon which the weight 19 slides. At 23 I have shown a pump, whereby pressure might be placed upon the opposite side of the diaphragm from that upon which the end 22 pushes. A pipe 24 is connected to the diaphragm through the pipe 26, as is also a pipe 27, which pipe 27 extends to a recording indicator 28 located at the well close to the drilling operations. The receiver 16 is preferably pear-shaped as shown, and has a restricted outlet opening 29, which discharges onto a screen 31 secured to the bottom of the box 5.

As a result of this construction, as the mud issuing from the well through the pipe 11 empties onto the receiving fitting 8, the same will flow through the screen 9, and should any small rocks be in it, they will be discharged into the sluice box. This mud will pass into the pipe 6 and into the receiver 16, which receiver will fill up due to the fact that the inlet is larger than the outlet. Consequently, as the material backs up in the fitting 8, only a sufficient amount can pass through the strainer 9 to replenish that escaping from the small opening 29; and as a result, the excess material or mud will pass over the strainer 9 and serve to flush therefrom any accumulated material, such as stones, which might tend to rest upon the strainer were the entire flow through the fitting. As soon as the receiver 16 is filled, it will cause pressure against the pin 22, affecting the diaphragm so that pressure therefrom will be conducted through the pipes 26 and 27 to the pressure gage or indicators 28 and 32. Therefore, if there is any change in the material arising from the well, it will be instantly discernible on the indicators, and, consequently, the drill men will understand the conditions underground. It is, of course, understood that the receiver while empty has been balanced by the weight 19 and the needle on the indicators placed at zero through the use of the pump 23. The operator can now determine at all times the weight of the mud coming from the well.

A hand hole 15 permits cleaning of the interior of the receiver 16. The cleaning is necessary because the mud will at times cake on the interior of the receiver, and therefore, an accurate weighing of the mud passing through would not be possible.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A weighing device comprising a pivoted arm, a receiver mounted in said pivoted arm, said receiver being enclosed and having an inlet port and an outlet port, the area of the inlet port being greater than the area of the outlet port, a pipe flexibly connected to said inlet port and capable of discharging material thereinto, said pipe having an upturned end, a strainer carried by said end, whereby when said receiver is filled, material issuing over said strainer will flush said strainer passing only an amount equal to the discharge of said receiver, and means including a pressure gage actuated by said pivoted arm when the material passing through said receiver changes in weight.

2. A device for measuring the specific gravity of drilling fluid from a well, comprising a pivoted arm, a fluid receiver carried by the arm, said receiver being enclosed and having an inlet port and an outlet port, the area of the inlet port being greater than the area of the outlet port, a pipe flexibly connected to said inlet port for discharging fluid into the receiver, an outwardly projecting strainer associated with the inlet and of said pipe, whereby when said receiver is filled, fluid issuing over said strainer will flush said strainer passing only an amount equal to the discharge of said receiver, and means including a pressure gauge actuated by said pivoted arm when the fluid passing through said receiver changes in weight.

DORSEY HUBERT TINSLEY.